(12) United States Patent
McCarthy et al.

(10) Patent No.: US 9,274,547 B2
(45) Date of Patent: Mar. 1, 2016

(54) DISPLAY WITH AN OPTICAL SENSOR

(75) Inventors: John P. McCarthy, Pleasanton, CA (US); Bradley Neal Suggs, Sunnyvale, CA (US); Robert Campbell, Cupertino, CA (US)

(73) Assignee: Hewlett-Packard Development Compamy, L.P., Houston, TX (US)

( * ) Notice: Subject to any disclaimer, the term of this patent is extended or adjusted under 35 U.S.C. 154(b) by 306 days.

(21) Appl. No.: 13/386,432

(22) PCT Filed: Oct. 9, 2009

(86) PCT No.: PCT/US2009/060283
§ 371 (c)(1),
(2), (4) Date: Jan. 23, 2012

(87) PCT Pub. No.: WO2011/011024
PCT Pub. Date: Jan. 27, 2011

(65) Prior Publication Data
US 2012/0120038 A1   May 17, 2012

(30) Foreign Application Priority Data

Jul. 23, 2009   (WO) ................ PCT/US2009/051583
Jul. 23, 2009   (WO) ................ PCT/US2009/051599

(51) Int. Cl.
*G06F 1/16*     (2006.01)
*G06F 3/0488*   (2013.01)
*G06F 3/042*    (2006.01)

(52) U.S. Cl.
CPC ................ *G06F 1/16* (2013.01); *G06F 1/1601* (2013.01); *G06F 3/042* (2013.01); *G06F 3/0421* (2013.01); *G06F 3/04886* (2013.01); *G06F 3/0425* (2013.01); *G06F 2200/1631* (2013.01); *G06F 2203/04101* (2013.01)

(58) Field of Classification Search
None
See application file for complete search history.

(56) References Cited

U.S. PATENT DOCUMENTS

| 4,529,316 | A  | * | 7/1985  | DiMatteo ...................... 356/602 |
| 5,579,037 | A  |   | 11/1996 | Tahara et al. |
| 6,614,422 | B1 |   | 9/2003  | Rafii et al. |
| 2004/0046744 | A1 | * | 3/2004 | Rafii et al. .................... 345/168 |
| 2005/0001824 | A1 | * | 1/2005 | Yoshimura .................... 345/179 |
| 2005/0116928 | A1 | * | 6/2005 | Bohn et al. .................... 345/157 |

(Continued)

FOREIGN PATENT DOCUMENTS

| JP | 02-165313 | 6/1990 |
| JP | 05-160702 | 6/1993 |

(Continued)

OTHER PUBLICATIONS

International Searching Authority, International Search Report and Written Opinion, Appln No. PCT/US2009/060283, date of mailing Aug. 2, 2010, 12 p.

(Continued)

*Primary Examiner* — Kent Chang
*Assistant Examiner* — Sujit Shah
(74) *Attorney, Agent, or Firm* — HP Inc Patent Department

(57) ABSTRACT

A display system can include a panel 110. The panel 110 can include a perimeter 117 and can display images on a front side. A bezel 170 can extend from the perimeter of the panel. The display system can include a designated area 140 on the bezel. A three dimensional optical sensor 115 can generate information to determine if an object is in contact with the designated area on the bezel.

15 Claims, 6 Drawing Sheets

(56) References Cited

U.S. PATENT DOCUMENTS

| | | | |
|---|---|---|---|
| 2005/0200612 A1 | 9/2005 | Tanaka et al. | |
| 2006/0238517 A1* | 10/2006 | King et al. | 345/173 |
| 2007/0089915 A1 | 4/2007 | Ogawa et al. | |
| 2008/0001773 A1* | 1/2008 | Rye et al. | 340/825.22 |
| 2008/0094369 A1* | 4/2008 | Ganatra et al. | 345/173 |
| 2008/0120568 A1 | 5/2008 | Jian et al. | |
| 2008/0122803 A1 | 5/2008 | Izadi et al. | |
| 2008/0178224 A1* | 7/2008 | Laude et al. | 725/44 |
| 2008/0252599 A1* | 10/2008 | Ross et al. | 345/157 |
| 2008/0297483 A1* | 12/2008 | Kim et al. | 345/173 |
| 2008/0297484 A1* | 12/2008 | Park et al. | 345/173 |
| 2009/0053997 A1* | 2/2009 | Jobling et al. | 455/41.2 |
| 2009/0058832 A1* | 3/2009 | Newton | 345/175 |
| 2009/0128498 A1 | 5/2009 | Hollemans et al. | |
| 2009/0198359 A1* | 8/2009 | Chaudhri | 700/94 |

FOREIGN PATENT DOCUMENTS

| | | |
|---|---|---|
| JP | 05-300618 | 11/1993 |
| JP | 2008-145386 | 6/2008 |
| KR | 2007-0037773 | 4/2007 |

OTHER PUBLICATIONS

Korean Intellectual Property Office, International Search Report for PCT/US2009/051587 dated Apr. 26, 2010 (3 pages).

Korean Intellectual Property Office, International Search Report for PCT/US2009/051599 dated Apr. 21, 2010 (3 pages).

Korean Intellectual Property Office, Written Opinion of the International Searching Authority for PCT/US2009/051587 dated Apr. 26, 2010 (3 pages).

Korean Intellectual Property Office, Written Opinion of the International Searching Authority for PCT/US2009/051599 dated Apr. 21, 2010 (3 pages).

The International Bureau of WIPO, International Preliminary Report on Patentability for PCT/US2009/051587 dated Jan. 24, 2012 (4 pages).

The International Bureau of WIPO, International Preliminary Report on Patentability for PCT/US2009/051599 dated Jan. 24, 2012 (6 pages).

The International Bureau of WIPO, International Preliminary Report on Patentability for PCT/US2009/060283 dated Feb. 2, 2012 (8 pages).

* cited by examiner

DISPLAY WITH AN OPTICAL SENSOR

CROSS-REFERENCE TO RELATED APPLICATIONS

This application is a national stage application under 35 U.S.C. §371 of PCT/US2009/060283, filed Oct. 9, 2009, which claims priority from PCT/US2009/051599 and PCT/US2009/051587, both filed on Jul. 23, 2009.

BACKGROUND

A resistive touch screen panel is composed of two thin, metallic, electrically conductive layers separated by a narrow gap. When an object, such as a finger, presses down on a point on the panel's outer surface the two metallic layers become connected at that point and the panel then behaves as a pair of voltage dividers with connected outputs. This causes a change in the electrical current which is registered as a touch event and sent to the controller for processing. A capacitive touch screen panel is a sensor that is a capacitor in which plates include overlapping areas between the horizontal and vertical axes in a grid pattern. The human body also conducts electricity and a touch on the surface of the sensor will affect the electric field and create a measurable change in the capacitance of the device.

BRIEF DESCRIPTION OF THE DRAWINGS

Some embodiments of the invention are described with respect to the following figures.

DETAILED DESCRIPTION

A computing system may have buttons that can be programmed to perform a function. For example a computing system may have buttons to open a web browser, to open email or adjust the volume. These buttons may be mechanical buttons, capacitive buttons or resistive buttons.

A mechanical button may include a dome for example wherein if the dome is deformed by the activation of the button the contact in the dome forms a connection with another contact layer and a function on the computing system. A mechanical button may have a useful life after which there functionality may degrade, for example if the button is often used the contacts that generate the signal may become inoperative. Mechanical buttons may also be susceptible to foreign contaminates such as dust or liquids. Capacitive buttons react to an object such as a user's hand changing the capacitance around the button area.

In one embodiment, a three dimensional optical sensor is mounted behind a transparent layer of a display. The three dimensional optical sensor can be mounted outside of the perimeter of the panel of the display system. Mounting the three dimensional optical sensor outside the perimeter of the display panel increases the transfer of light from the panel to the user because there are no layers that are part of the display system attached to the transparent layer that reduce the light transfer or degrade the clarity of the image produced by the panel. Mounting the optical sensor behind the transparent layer of the display can protect the optical sensor from being contaminated with foreign substances such as dust. If the field of view of the optical sensor became contaminated with a foreign substance over the transparent layer obstructing the optical sensors field of view the transparent layer may be cleaned without making separate provisions for cleaning the optical sensor.

The three dimensional optical sensors can have a field of view beyond the perimeter of the display panel. Around the perimeter of the display panel can be a bezel. The bezel can be part of the transparent layer or may be a separate part. The bezel can include designated areas. The designated areas on the bezel can be viewed by the three dimensional optical sensor to determine if an object comes in contact with the designated area on the bezel. By determining the position of an object with a three dimensional optical sensor multiple designated areas can be used on the bezel with a single three dimensional optical sensor.

In one embodiment a display system can include a panel. The panel can include a perimeter and can display images on a front side. A bezel can extend from the perimeter of the panel. An area on the bezel can be designated to perform a function if contacted. A three dimensional optical sensor can determine if an object is in contact with the designated area.

Figure 1:
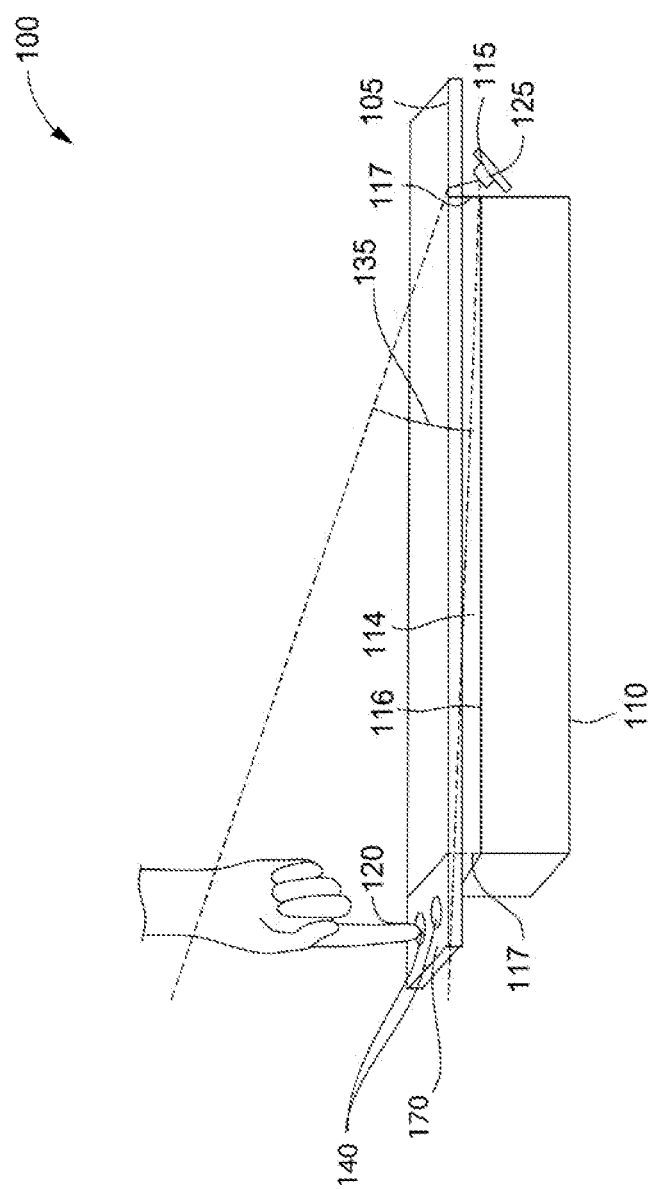
FIG. 1 is a display according to an exemplary embodiment of the invention.

Referring to the figures, FIG. 1 is a display system 100 according to an exemplary embodiment of the invention. The display system 100 includes a panel 110 and a transparent layer 105 in front of the surface 116 of the panel 110 for displaying images. The front of the panel 110 is the surface 116 that displays an image and the back of the panel 110 is opposite the front. A three dimensional optical sensor 115 can be on the same side of the transparent layer as the panel 110 to protect the three dimensional optical sensor 115 from contaminates. In an alternative embodiment the three dimensional optical sensor 115 may be in front of the transparent layer 105. The transparent layer 105 can be glass, plastic, or another transparent material. The panel 110 may be a liquid crystal display (LCD) panel, a plasma display, a cathode ray tube (CRT), an OLED or a projection display such as digital light processing (DLP), for example. In one embodiment, mounting the three dimensional optical sensors in an area of the display system 100 that is outside of the perimeter 117 of the surface 116 of the panel 110 provides that the clarity of the transparent layer is not reduced by the three dimensional optical sensor.

The three dimensional optical sensor 115 can determine the depth from the three dimensional optical sensor of an object 120 located in the field of view 135 of the three dimensional optical sensor 115. The depth of the object 120 can be used in one embodiment to determine if the object is in contact with a designated area 140. The depth of the object can be used in one embodiment to determine if the object is within a programmed distance 130 of the display but not contacting the designated area 140. For example the object 120 may be a user's hand and finger approaching the designated area 140.

The display system 100 can include designated areas 140 on the bezel 170 of the display system 100. The designated areas 140 are an area on the bezel 170 that when contacted by an object performs a function of the computing system. In one embodiment, the designated areas 140 are printed on the bezel 170 to identify to a user where on the bezel 170 the designated areas are located. The function of the designated area may also be indicated on the bezel 170 to identify what function will occur if there is contact with the designated area 140 on the bezel 170. In one embodiment the indication may be provided by a light source to project a pattern on the bezel from the front or the back of the bezel. The projected pattern may change if the function of the designated area changes. The pattern may be for example text that describes the function, a symbol that describes the function or some other indication of the function of the designated area 140. If the object 120 is within the field of view 135 of the three dimensional optical sensor 115, light from the light source 125 can reflect from the object and be captured by the three dimensional optical sensor 115.

In one embodiment a gap 114 can be between the transparent layer 105 and the panel 110. The gap 114 can allow the three dimensional optical sensor 115 to have a field of view of the transparent layer 105 from between the transparent layer 105 and the panel 110. The gap 114 can also extend past the perimeter of the panel in to the area behind the bezel. In one embodiment, the bezel is opaque to visible light but transparent to the light captured by the three dimensional optical sensor. If the bezel is transparent to the light captured by the three dimensional optical sensor the light can travel in the gap from the bezel to the three dimensional optical sensor. The gap may be for example from 0.1 centimeters to 0.5 centimeters but the gap may be other amounts. The field of view of the three dimensional optical sensor 115 includes the perimeter 117 on the transparent layer 105. If the bezel is not transparent to the light captured by the three dimensional optical sensor then the three dimensional optical sensor can be located to allow the field of view to include the surface of a surface of the bezel where the designated areas are located. In one embodiment a prism may be used to bend the light to include the bezel in the field of view of the three dimensional optical sensor.

In one embodiment, the optical sensor can be configured after attaching the optical sensor to the panel. For example, after attaching the optical sensor to the display a computer displaying information on the panel can be trained by displaying objects on the panel. The user can then contact the display where the objects are displayed on the panel and the computer can calibrate the optical sensor so that future contact with the display is interpreted by the computer as a contact of the display.

Figure 2:
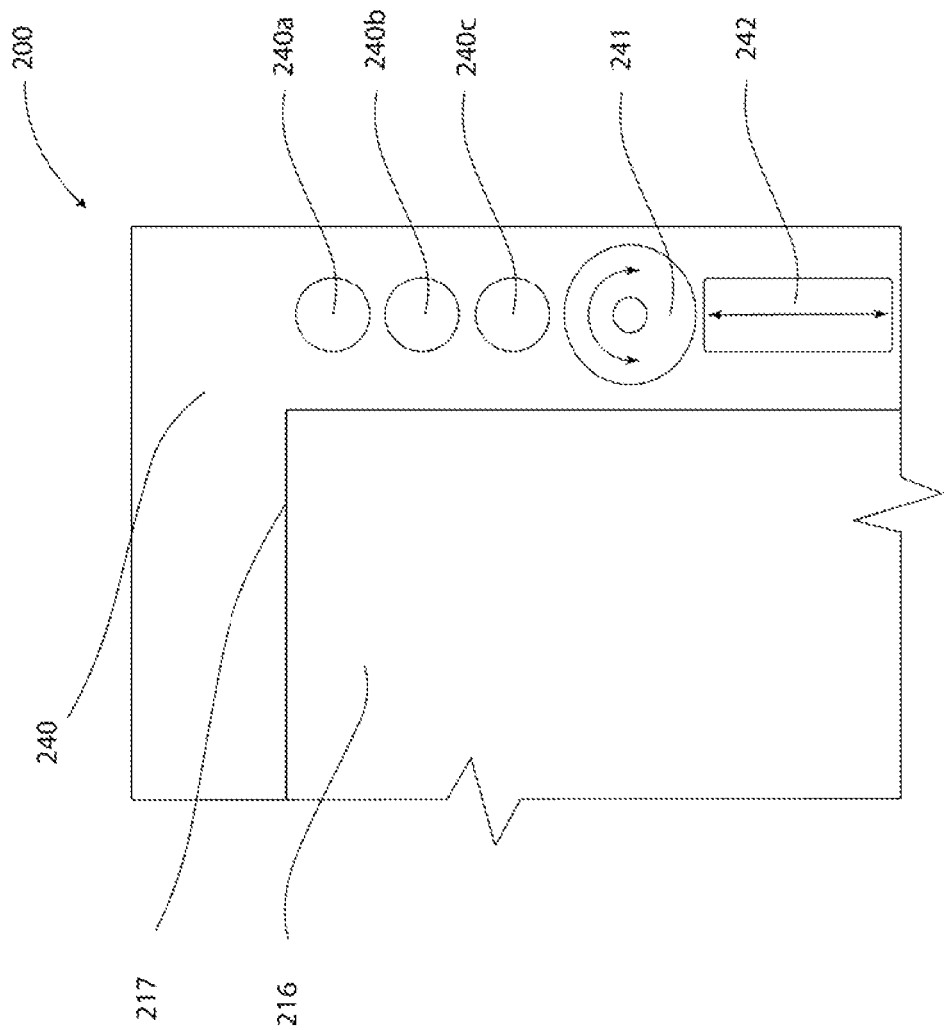
FIG. 2 is a portion of the display according to an exemplary embodiment of the invention.

FIG. 2 is a portion of the display 200 according to an exemplary embodiment of the invention. The portion of the display 200 can include multiple designated areas 240a-242. The designated areas 240a-242 can be located on the bezel 240 that is outside of the perimeter 217 of the display panel 216. The designated areas can operate as a button 240a-c. The buttons can perform function for the display such as activating an adjustment menu or changing the input of the display, in another example the button may open an application such as a web browser or email program or may change a setting of the computer such as the network settings. The designated area 241 can be a scroll wheel. The scroll wheel can be used to move a cursor up or down through a document, move up and down through a list or perform another function, for example. The designated area 242 can be a scroll bar. The scroll bar can be used to change the volume of the audio from the computing system, may zoom in on an object or perform another function, for example.

Figure 3:
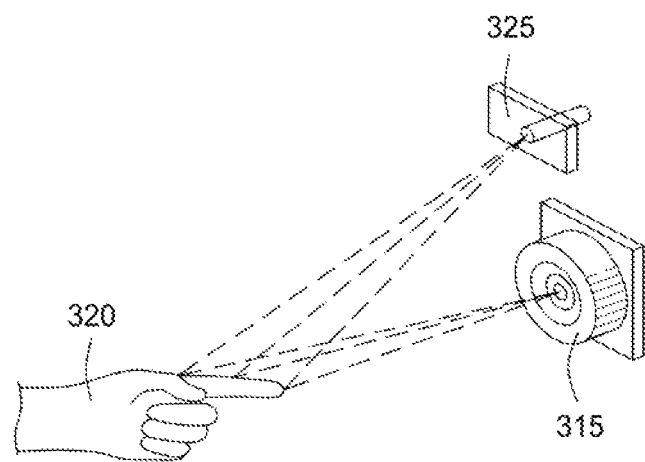
FIG. 3 is a three dimensional optical sensor according to an exemplary embodiment of the invention.

FIG. 3 is a three dimensional optical sensor 315 according to an exemplary embodiment of the invention. The three dimensional optical sensor 315 can receive light from a source 325 reflected from an object 320. The light source 325 may be for example an infrared light or a laser light source that emits light that is invisible to the user. The light source 325 can be in any position relative to the three dimensional optical sensor 315 that allows the light to reflect off the object 320 and be captured by the three dimensional optical sensor 315. The infrared light can reflect from an object 320 that may be the user's hand, in one embodiment and is captured by the three dimensional optical sensor 315. An object in a three dimensional image is mapped to different planes giving a Z-order, order in distance, for each object. The Z-order can enable a computer program to distinguish the foreground objects from the background and can enable a computer program to determine the distance the object is from the display.

Two dimensional sensors that use a triangulation based methods such as stereo may involve intensive image processing to approximate the depth of objects. The two dimensional image processing uses data from a sensor and processes the data to generate data that is normally not available from a two dimensional sensor. Intensive image processing may not be used for a three dimensional sensor because the data from the three dimensional sensor includes depth data. For example, the image processing for a time of flight three dimensional optical sensor may involve a simple table-lookup to map the sensor reading to the distance of an object from the display. The time of flight sensor determines the depth from the sensor of an object from the time that it takes for light to travel from a known source, reflect from an object and return to the three dimensional optical sensor. The depth of an object in the image can be determined from the three dimensional optical sensor that does not use a second three dimensional optical sensor to determine the distance of the object in the image.

In an alternative embodiment the light source can emit structured light that is the projection of a light pattern such as a plane, grid, or more complex shape at a known angle onto an object. The way that the light pattern deforms when striking surfaces allows vision systems to calculate the depth and surface information of the objects in the scene. Integral imaging is a technique which provides a full parallax stereoscopic view. To record the information of an object, a micro lens array in conjunction with a high resolution optical sensor is used. Due to a different position of each micro lens with respect to the imaged object, multiple perspectives of the object can be imaged onto an optical sensor. The recorded image that contains elemental images from each micro lens can be electronically transferred and then reconstructed in image processing. In some embodiments the integral imaging lenses can have different focal lengths and the objects depth is determined based on if the object is in focus; a focus sensor, or out of focus, a defocus sensor. The embodiments of the invention are not limited to the type of three dimensional optical sensors that have been described but may be any type of three dimensional sensor.

Figure 4:
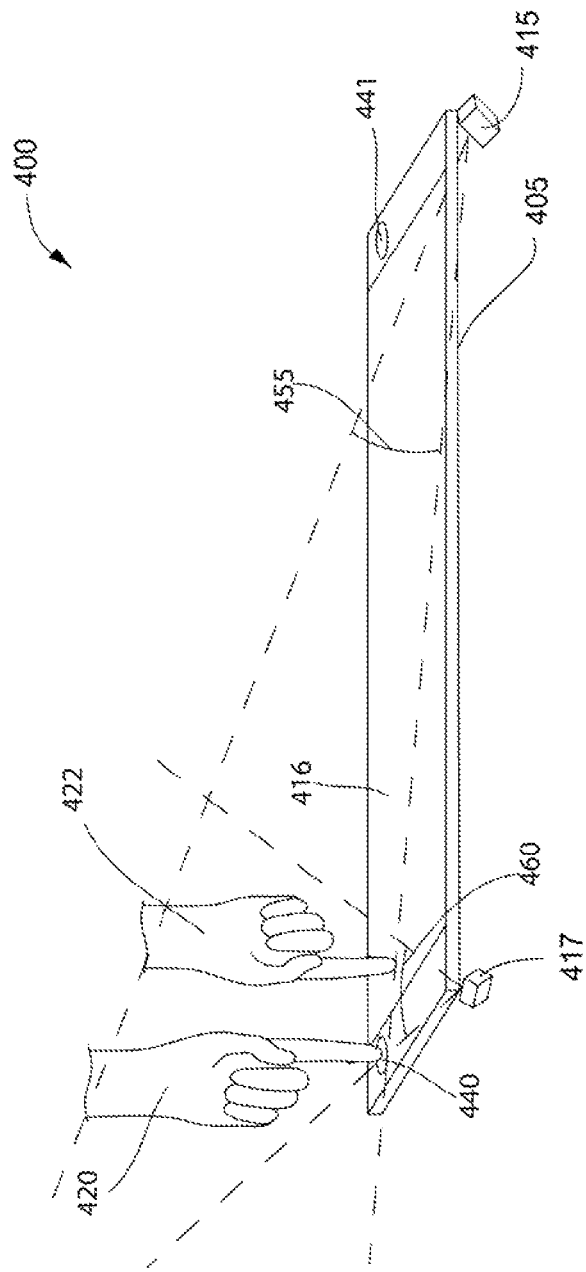
FIG. 4 is a display according to an exemplary embodiment of the invention.

FIG. 4 is a display according to an exemplary embodiment of the invention. A computing system may be able to perform multiple functions based on two designated areas being contacted. A display system 400 that can sense more than one object 420 may be able to perform additional tasks.

In one embodiment, there is a first three dimensional optical sensor 415 and a second three dimensional optical sensor 417. The first three dimensional optical sensor 415 may have a field of view including portion 455 that includes a view of a designated area 440. In an embodiment that includes a gap between the transparent layer 405 and the panel a portion of the field of view may be behind the transparent layer 405. Within the field of view 455 an image of object 422 can be captured. A second object 420 cannot be seen by the first three dimensional optical sensor 415 because the first object 422 is between the first three dimensional optical sensor 415 and the second object 420. The field of view is obstructed by the first object 422 along the portion 455 of the field of view. The second three dimensional optical sensor 417 can capture within a portion 460 of the field of view of the second three dimensional optical sensor 417 an image including the depth of both the first object 422 and the second object 420. The first three dimensional optical sensor 415 can determine the distance of a first object 420, for example a user's finger. The first three dimensional optical sensor 415 may not be able to capture a second object 420, for example a finger on a user's other hand if the view by the first three dimensional optical sensor 415 of the second object 420 is obstructed by the first object 422. The first three dimensional optical sensor 415 and the second three dimensional optical sensor 417 may be in the corners of the display system 400 or the optical sensors may be located anywhere in or on the display such as the top, bottom, or sides. For example the first object 422 can be contacting an object displayed on the surface 416 of the panel while the second object 420 can be contacting the designated area 440 and to detect the second object 420 contacting the designated area 440 the second three dimensional optical sensor 417 can be used if the first object 422 is obstructing the view of the second object 420 from the first three dimensional optical sensor 415.

In one embodiment the second three dimensional optical sensor 417 may also be used if the field of view of the first three dimensional optical sensor 415 is too narrow to detect objects contacting designated area 441 on the same side of the display panel as the three dimensional optical sensor 415. For example the first three dimensional optical sensor 415 can see the designated area 440 on the across the panel while the optical sensor 415 may not have a field of view that includes the designated area 441 on the same side of the panel as the first three dimensional optical sensor 415 and the designated area 441 may be visible to the second three dimensional optical sensor 417.

A three dimensional optical sensor can be used to determine the size of objects because the depth from the optical sensor is known. If the depth from the optical sensor is not known the image of an object 422 may appear the same as a larger object 420 that is further away from the optical sensor 415. The size of the object may be used by the computing system to determine the type of object, such as a hand, finger, pen, or another object to contact the designated areas.

Figure 5:
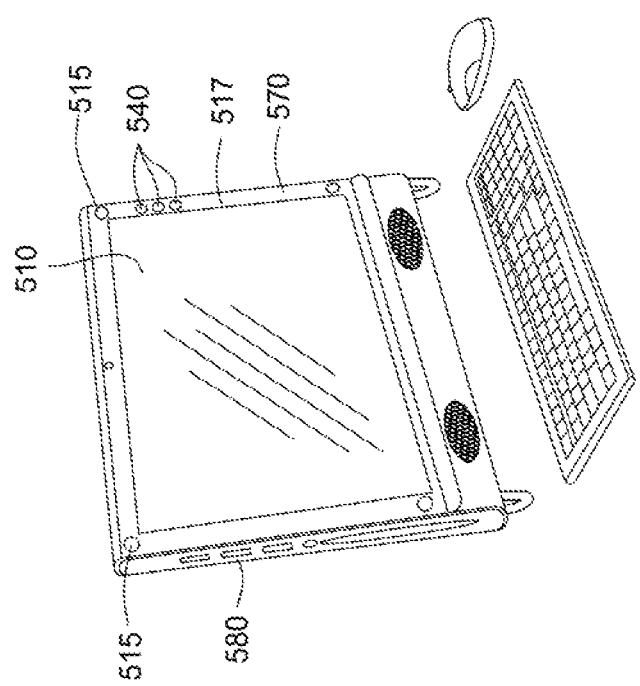
FIG. 5 is a display according to an exemplary embodiment of the invention.

FIG. 5 is a display according to an exemplary embodiment of the invention. The optical sensor has a viewable area that extends beyond the perimeter 517 of the display panel 510. The movement of objects beyond the perimeter 517 can activate functions of a computer system. In one embodiment, the designated area 540 can act as buttons and can be located outside of the perimeter 517 of the display panel 510. The designated area 540 may be a symbol or text printed on the bezel 570 that surround the display panel 510. The designated area has no moving parts and is not electrically connected to the computer system 580. The optical sensor 515 can detect when an object such as a user's finger has contacted a designated area 540. In one embodiment, the display system may be enclosed in a housing that also encloses a computing system 580 or the computing system may be in a separate housing from the housing of the display system.

Figure 6:
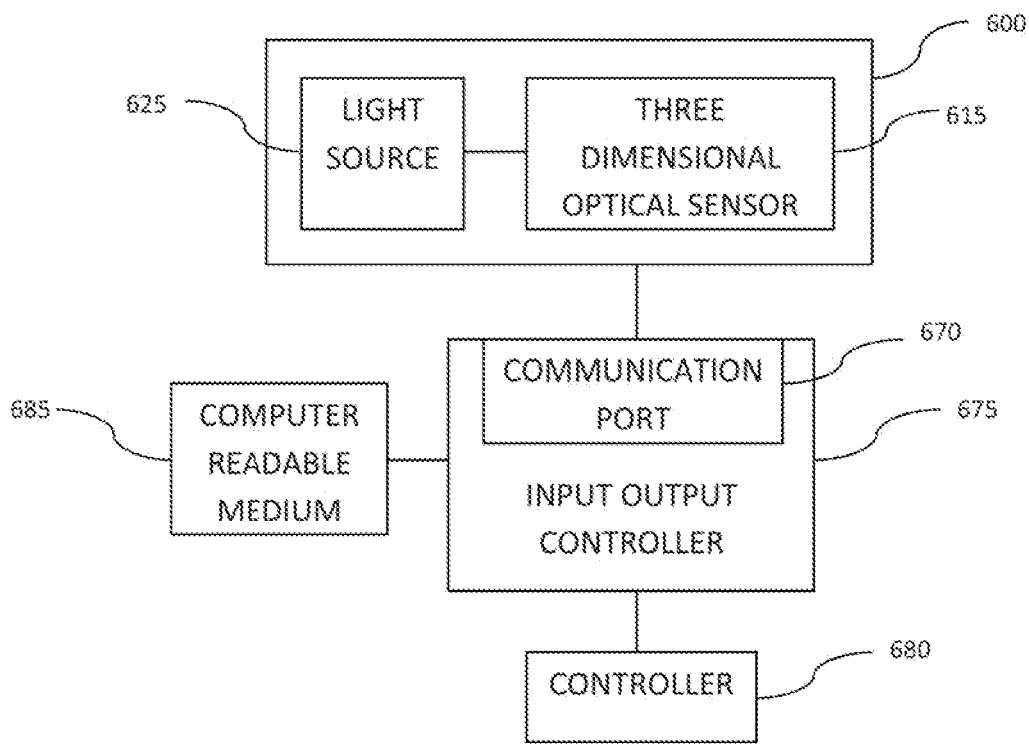
FIG. 6 is a block diagram according to an exemplary embodiment of the invention.

FIG. 6 is a block diagram according to an exemplary embodiment of the invention. The optical sensor module 600 includes the light source 625 and the optical sensor 615. The optical sensor module 600 can capture data that may include height, width, and depth of an object in an image. The optical sensor module 600 can connect to a communication port 670 to transmit captured data to a computing device. The communication port 670 can be a communication port 670 on a computing device. For example the communication port 670 can be a universal serial bus (USB) port or an IEEE 1394 port. The communication port 670 may be part of the input output controller 675 of the computing device, in one embodiment. The input output controller 675 can be connected to a computer readable medium 685. The input output controller 675 of a computing device can connect to a controller 680.

The controller 680 can receive information captured by the three dimensional optical sensor module 625 through the communication port 670 of the input output controller 675. The controller 680 can determine from the information captured by the three dimensional optical sensor module 600 the distance an object is from the optical sensor module 600. The controller 680 can determine the distance the object is from the optical sensor 615 and can determine if the object is in contact with a bezel on the display system from the data provided by the optical sensor 615. The controller 680 can be programmed to associate a designated area on the bezel of the computing system to function of the display or the computing system. In one embodiment, the controller 680 is a processor or an application specific integrated circuit (ASIC).

Figure 7:
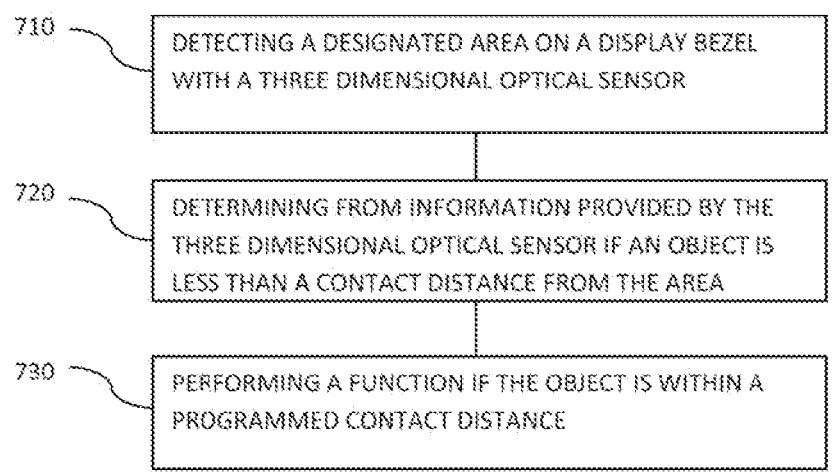
FIG. 7 is a flow diagram according to an exemplary embodiment of the method of the invention.

FIG. 7 is a flow diagram according to an exemplary embodiment of the method of the invention. The method begins by detecting a designated area on a display bezel with a three dimensional optical sensor (at 710). The computing device can determine from information provided by the three dimensional optical sensor if an object is less than a contact distance from the area (at 720). The computing device may determine from the depth information that the object is contacting the designated area if the distance of the object from the display system is substantially zero centimeters. In one embodiment, substantially zero means that the resolution of the three dimensional optical sensor may not be able to determine contact with the display and an object that is less than a contact distance from the display system may have depth information from the three dimensional optical sensor that is determined by the computing device to be a distance of zero and a contact with the display system. A contact distance may be for example 0.2 centimeters from the designated area but may be other distances. If the object comes in contact with the designated area the calculated distance that the object is from the designated area is zero.

The computing device can perform a function if the object is within a programmed contact distance of the designated area (at 730). The function performed by the computing system can be, for example, controlling the volume, controlling the display brightness, and controlling multimedia functions such as play, stop, pause, fast forward, rewind, or may be another computing system function. In one embodiment the function can be continued until the object is no longer less than the contact distance. For example, if the function is to increase the audio volume then the volume can continue to increase until the object is no longer less than the contact distance. In another embodiment a second function may be performed if the designated area is contacted for more than a programmed period of time. For example if the designated area is to decrease the volume contact with the area for more than a programmed period of time may mute the audio.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A display system comprising:
   a display panel to display images on a front side of the display panel;
   a bezel extending from and outside the perimeter of the display panel;
   a designated area on the bezel;
   a three dimensional optical sensor to generate information that determines if an object is in contact with the designated area on the bezel; and
   a light source to project a plurality of patterns onto the designated area on the bezel, each pattern of the plurality of patterns to indicate a respective function to be performed if contact is made between the object and the designated area;
   wherein the designated area is to indicate multiple functions, each function of the multiple functions visually indicated by a different pattern of the plurality of patterns projected onto the designated area by the light source; and
   wherein a first pattern of the plurality of patterns is a slider, and a second pattern of the plurality of patterns is a scroll wheel.

2. The display system of claim 1, further comprising a second three dimensional optical sensor to determine if an object is in contact with a second designated area located in a field of view of the second three dimensional optical sensor.

3. The display system of claim 1, wherein the three dimensional optical sensor is attached outside of the perimeter of the display panel.

4. The display system of claim 1, wherein the three dimensional optical sensor is selected from the group consisting of a time of flight sensor, a structured light sensor, a focus sensor, and a defocus sensor.

5. The display system of claim 1, further comprising:
   a transparent layer in front of the display panel and the three dimensional optical sensor, wherein the images displayed by the display panel are to pass through the transparent layer to a viewer,
   wherein the three dimensional optical sensor is to receive light reflected from the object through the transparent layer.

6. The display system of claim 5, further comprising a gap between the transparent layer and the display panel, wherein the light reflected from the object is to travel through the gap to the three dimensional optical sensor.

7. The display system of claim 6, wherein the bezel is transparent to light and the light reflected from the object is to pass through the bezel to the gap.

8. The display system of claim 1, further comprising a controller to determine a size of the object, and to determine, based on the determined size, a type of the object of a plurality of different types of object.

9. A method comprising:
   illuminating a first designated area on a bezel with a first light pattern comprising a slider to indicate a first function, the bezel extending from and outside a perimeter of a display panel;
   detecting the first designated area with a three dimensional optical sensor;
   determining from first information provided by the three dimensional optical sensor if an object is less than a contact distance from the first designated area;
   performing the first function corresponding to the slider in response to determining that the object is less than the contact distance from the first designated area;
   illuminating a second designated area with a second light pattern comprising a scroll wheel to indicate a second function;
   detecting the second designated area with the three dimensional optical sensor;
   determining from second information provided by the three dimensional optical sensor if the object is less than the contact distance from the second designated area; and
   performing the second function corresponding to the scroll wheel in response to determining that the object is less than the contact distance from the designated area.

10. The method of claim 9, further comprising generating the first information from the group consisting of time of flight information, structured light information, focus depth information, and defocus depth information.

11. The method of claim 9, wherein the first function is selected from one of controlling a sound volume, controlling a display brightness, and controlling a multimedia function.

12. The method of claim 9, wherein the first information provided by the three dimensional optical sensor is responsive to light reflected from the object, the light reflected from the object traveling through a gap between a transparent layer and the display panel, the transparent layer in front of the display panel and the three dimensional optical sensor such that images displayed by the display panel pass through the transparent layer to a viewer, and the three dimensional optical sensor receives the light reflected from the object through the transparent layer.

13. The method of claim 12, wherein the bezel is transparent to light, and wherein the light reflected from the object passes through the bezel to the gap.

14. A non-transitory computer readable medium comprising instructions that upon execution cause a processor to:
   cause a plurality of light patterns to be projected onto a designated area of a bezel that extends from and is outside a perimeter of a display panel, each light pattern of the plurality of light patterns associated with a different function to be performed upon an object contacting the designated area, and wherein a first light pattern of the plurality of light patterns includes a slider, and a second light pattern of the plurality of light patterns includes a scroll wheel;
   receive information from a three dimensional optical sensor;

determine from the information if an object is contacting the designated area, wherein the object is determined to be contacting the designated area in response to the object being less than a contact distance from the designated area of the bezel; and perform a particular function associated with a light pattern of the plurality of light patterns in response to determining that the object is contacting the designated area.

15. The non-transitory computer readable medium of claim 14, further comprising instructions to continue to perform the particular function until the object is no longer contacting the designated area.

* * * * *